US006209605B1

(12) United States Patent
Lee et al.

(10) Patent No.: US 6,209,605 B1
(45) Date of Patent: *Apr. 3, 2001

(54) APPARATUS FOR APPLYING AN IMAGE TO A SPHERICAL SURFACE

(75) Inventors: David A. Lee; David R. Waters; Rocky A. Fisher, all of Muskogee, OK (US)

(73) Assignee: Signature Balls, L.L.C., Muskogee, OK (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,113

(22) Filed: Sep. 16, 1998

(51) Int. Cl.[7] .......................... B32B 31/20; G05B 11/00; B44C 1/165; B30B 15/06; B30B 9/00

(52) U.S. Cl. ....................... 156/359; 156/540; 156/583.1; 156/583.9; 156/240; 100/48; 100/318; 101/33; 118/666; 118/667; 427/148

(58) Field of Search .................................... 156/359, 540, 156/541, 542, 556, 558, 583.1, 583.2, 583.4, 583.6, 583.7, 583.9, 230, 240, 241, 247, 277, 289; 101/33, 34, DIG. 40, 41; 100/224, 315, 318, 269.13, 48; 427/146, 147, 148; 118/666, 667

(56) References Cited

U.S. PATENT DOCUMENTS

| | | | | |
|---|---|---|---|---|
| 1,547,339 | | 7/1925 | MacLellan . | |
| 3,434,902 | | 3/1969 | Bliss | 156/230 |
| 3,445,309 | | 5/1969 | Milliken | 156/89 |
| 3,580,772 | | 5/1971 | Ochoa | 156/240 |
| 3,648,600 | * | 3/1972 | Jaccard | 100/224 |
| 4,035,214 | | 7/1977 | Shuppert et al. | 156/240 |
| 4,163,421 | * | 8/1979 | Sihota | 101/41 |
| 4,300,974 | | 11/1981 | Bauer | 156/360 |
| 4,328,268 | | 5/1982 | Tsuji et al. | 428/40 |
| 4,491,494 | | 1/1985 | Davis, Jr. et al. | 156/240 |
| 4,503,095 | | 3/1985 | Seto et al. | 427/265 |
| 4,759,818 | | 7/1988 | Hiroshi | 156/359 |
| 4,770,733 | | 9/1988 | Chapman | 156/240 |
| 4,874,454 | | 10/1989 | Talalay et al. | 156/359 |
| 4,875,410 | | 10/1989 | Lee et al. | 101/170 |
| 4,973,374 | | 11/1990 | Karlyn | 156/238 |
| 5,170,704 | * | 12/1992 | Warren et al. | 101/41 |
| 5,296,081 | * | 3/1994 | Morin et al. | 156/498 |
| 5,382,313 | * | 1/1995 | Eminger | 156/583.1 |
| 5,395,478 | | 3/1995 | Sattler et al. | 156/481 |
| 5,565,055 | | 10/1996 | Croci | 156/238 |
| 5,567,261 | | 10/1996 | Schoetz | 156/238 |
| 5,584,961 | * | 12/1996 | Ellsworth et al. | 156/481 |
| 5,643,387 | | 7/1997 | Berghauser et al. | 156/230 |
| 5,832,819 | | 11/1998 | Widman | 101/34 |
| 5,913,956 | * | 6/1999 | Capps | 83/39 |

* cited by examiner

*Primary Examiner*—Richard Crispino
*Assistant Examiner*—J. A. Lorengo
(74) *Attorney, Agent, or Firm*—Brent A. Capehart; Fellers, Snider, Blankenship, Bailey & Tippens

(57) ABSTRACT

An apparatus for applying an image to a spherical surface utilizing a heat transfer device having a heating die with a convex surface. The concave surface allows for the transfer of an image onto an object having a spherical surface, such as a baseball or softball, without deforming said object.

16 Claims, 6 Drawing Sheets

APPARATUS FOR APPLYING AN IMAGE TO A SPHERICAL SURFACE

BACKGROUND OF THE INVENTION

The present invention relates to the decoration of objects, more specifically, the decoration of objects having spherical surface by means of a heat transferable image. For purposes of this application, the term "spherical surface" means the surface of an object have curvature in at least two different directions, with curvature of each directions being independent of the other direction or directions. Examples of such objects include baseballs and softballs.

Decorating systems using heat transfer labels and decals have received wide-spread commercial acceptance over the last several years. Typically, such decorating devices comprise of a conveyor for feeding objects to be labeled or a decal into a transfer location, a feed mechanism for sequentially positioning labels for decals at the transfer location and a device for placing a label or decal against an adjacent object at the transfer location. Samples of such systems appear in U.S. Pat. Nos. 5,565,055; 4,300,974 and 3,434,902.

One problem which poses a challenge to the prior art is that of applying the heat transferable image to a spherical surface. Typically, the objects which receive heat transferable labels or decals have flat surfaces or are cylinder type objects, such as bottles and mugs. U.S. Pat. No. 5,565,055 discloses a device for decorating cylindrical type objects having oval or round cross-sections such as antiperspirant bottles. U.S. Pat. No. 4,874,454 discloses a device for decorating a cylindrical object such as a mug. Apparatus of these types suffer the limitation that they are not able to adapt to applying a label or decal to an object having a spherical surface such as a ball.

One prior art reference is a machine which uses a heat transfer process to transfer an image to a spherical surface, such as a baseball, by flattening out the surface prior to the transfer. This reference does not attempt to transfer an image to a curved surface but rather to a flat surface which later becomes a curved surface. This device does not resolve the need for providing an apparatus which can apply an image to a spherical surface.

Accordingly, it is the principle object of the invention to achieve an apparatus for transferring an image to an object having a spherical surface.

Another object of the invention is to achieve an apparatus for transferring an image to spherical shaped objects having a variety of dimensions.

SUMMARY OF THE INVENTION

In accordance with the above and related objects, the present invention provides an apparatus for transferring images to objects having spherical surfaces. The present invention is designed to provide contact between heating surface portion of the apparatus and the spherical shaped periphery of an object wherein the heat transferable image is positioned therebetween.

The present invention in accordance with the above-mentioned objects provides a device for applying the heat transferable image to an object with a spherical surface. This is performed by the use of a heat transfer apparatus having a heating die having a concave surface which when engaged with the spherical surface of an object is able to compress an image to conform to said spherical surface. Heat is then applied to the heating die by way of a heating means such as a band heater. This will allow the heat transferable image to be bonded and transferred permanently to the spherical surface of the object.

A transfer means such as a drive motor coupled with a linear actuator is used to accurately position the heating die against the object.

In accordance with another object of the present invention the heating die can be removable. This would allow for a variety of heating dies each having a different concave surface to be used to apply images to objects having varying dimensions.

DETAILED DESCRIPTION OF THE PREFERRED EMBODIMENTS

Figure 1:
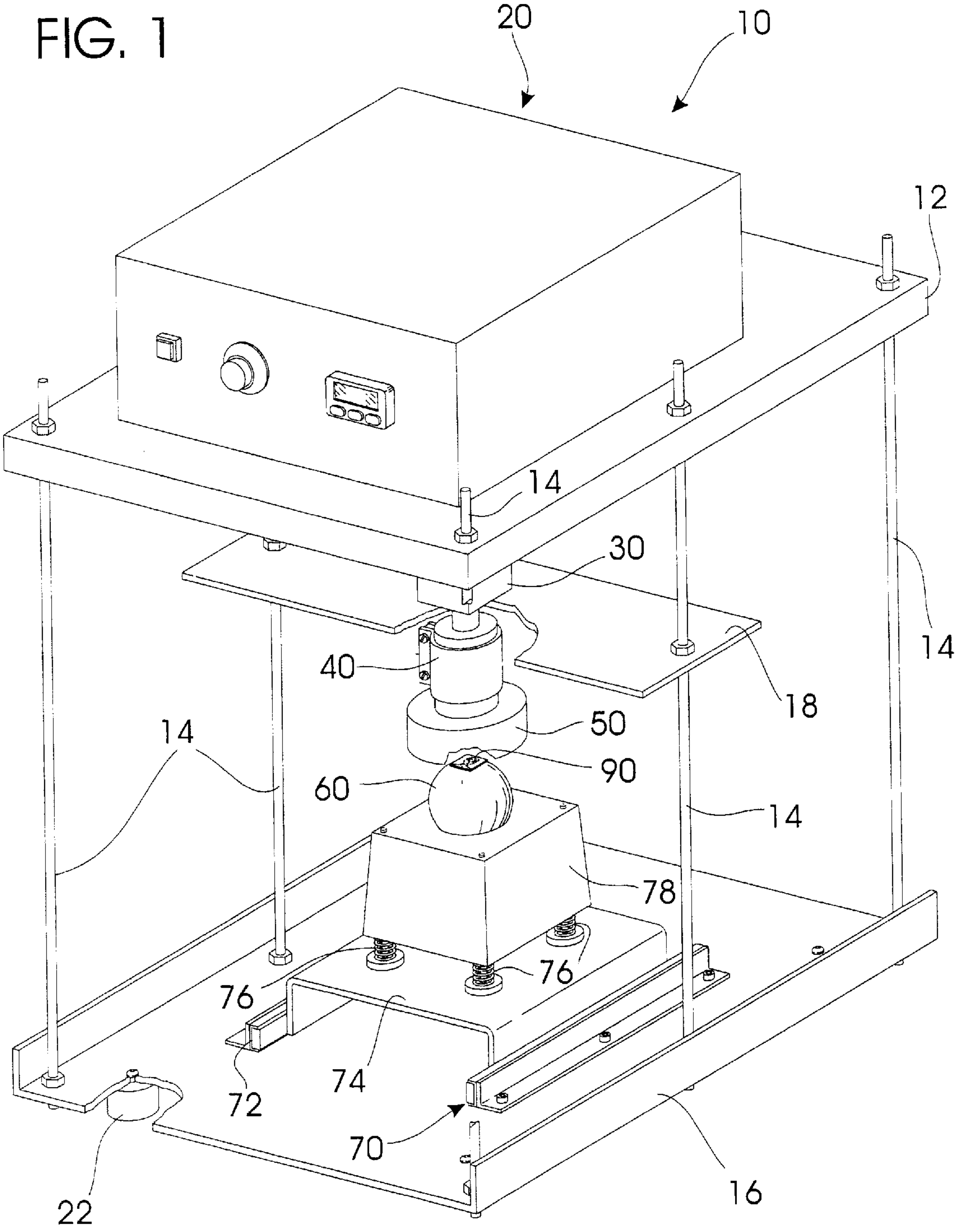
FIG. 1 is a perspective view of the invention.

Reference should now be had to FIGS. 1 through 9 for a detailed description of the apparatus of the invention for applying an image to a spherical surface. FIG. 1 illustrates a machine 10 having a first platform 12 supported above a base 16 by a plurality of vertical supports 14. A control means 20 is in communication with first platform 12.

Contained within control means 20 is an electronic controls and the drive motor (not shown). Drive motor is powered by a power supply which is also not shown. The power supply can be an electrically based power supply, such as a power cord running from an outlet.

Connected to the drive motor is an actuator 30. Actuator 30 is in a vertical alignment having a top end and a bottom end with the top end connected to the drive motor. A heat source 40 is connected to the bottom end of actuator 30 by way of an extension arm 32. The heat transfer die 50 is connected to heat source 40, the heat source die assembly is able to be raised and lower to a desired position by way of extension arm 32.

In the present embodiment, tray assembly 70 is connected to base 16 and comprises of tray 74 which is moveable along rails 72. Holding block 78 is in communication with tray 74 by way of support posts 75 and springs 76. Springs 76 provide counter tension when the present invention is in operation.

Holding block 78 has a top 80, a bottom 86 and a plurality of sides 84. Contained within top 80 is a concave depression 82. Concave depression 82 is dimensioned in order to snugly receive an object having a spherical surface, such as a baseball or softball.

Figure 2:
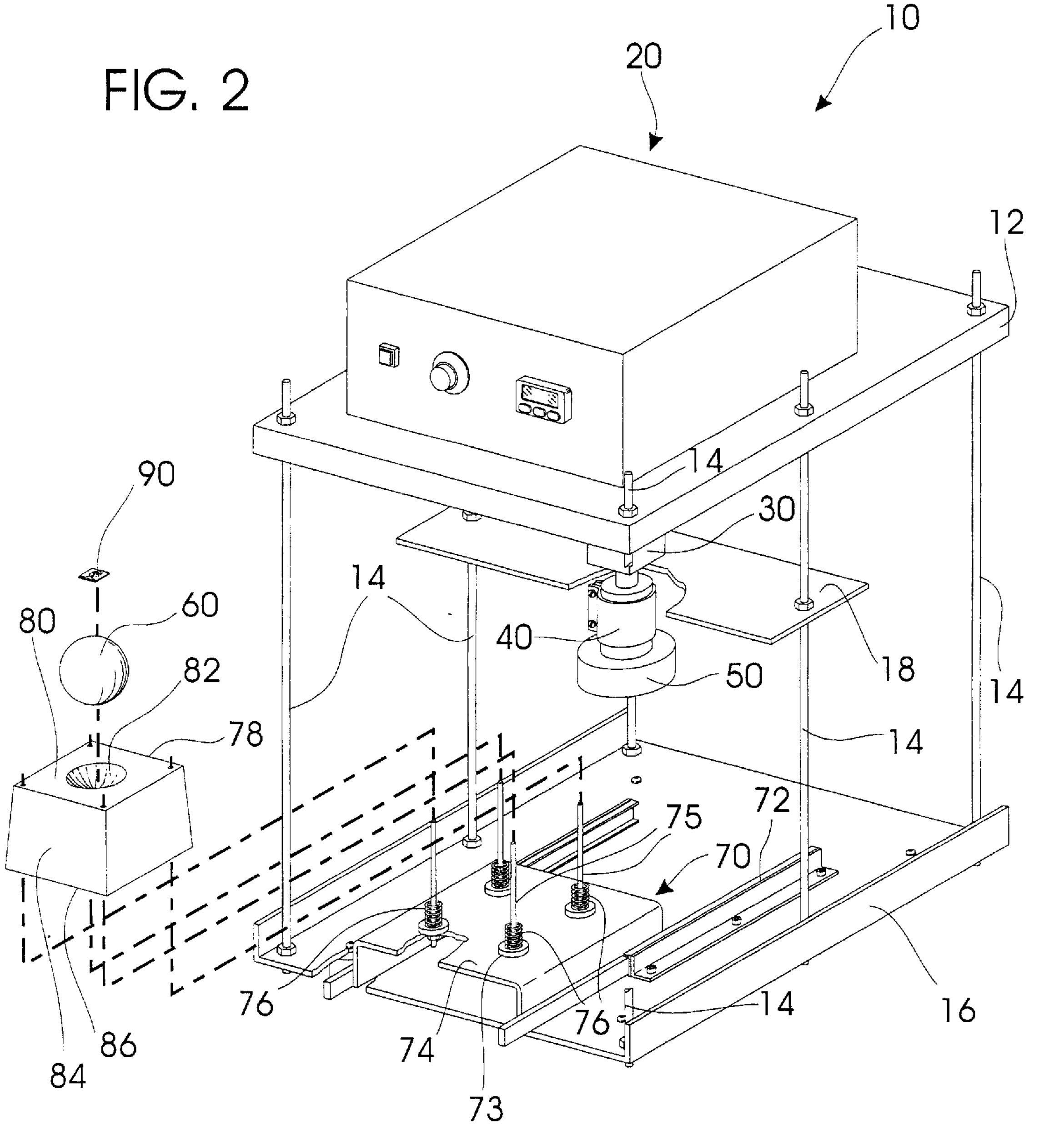
FIG. 2 is a perspective view of the present invention showing an exploded view of the tray assembly portion thereof.
Figure 3:
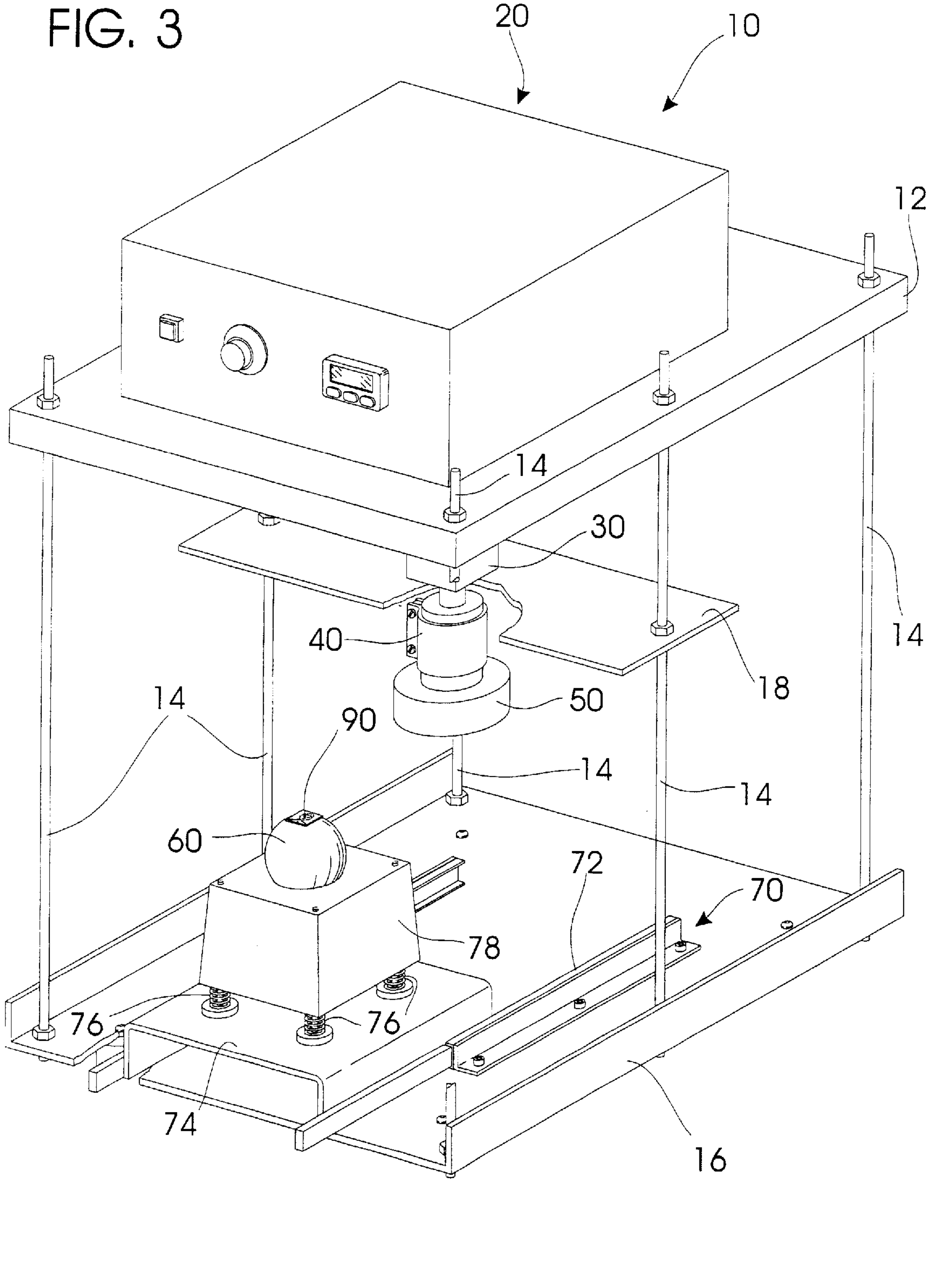
FIG. 3 is a perspective view of the present invention showing an object having a spherical surface after it has been loaded into the machine but prior to the transfer of the image thereto.
Figure 4:
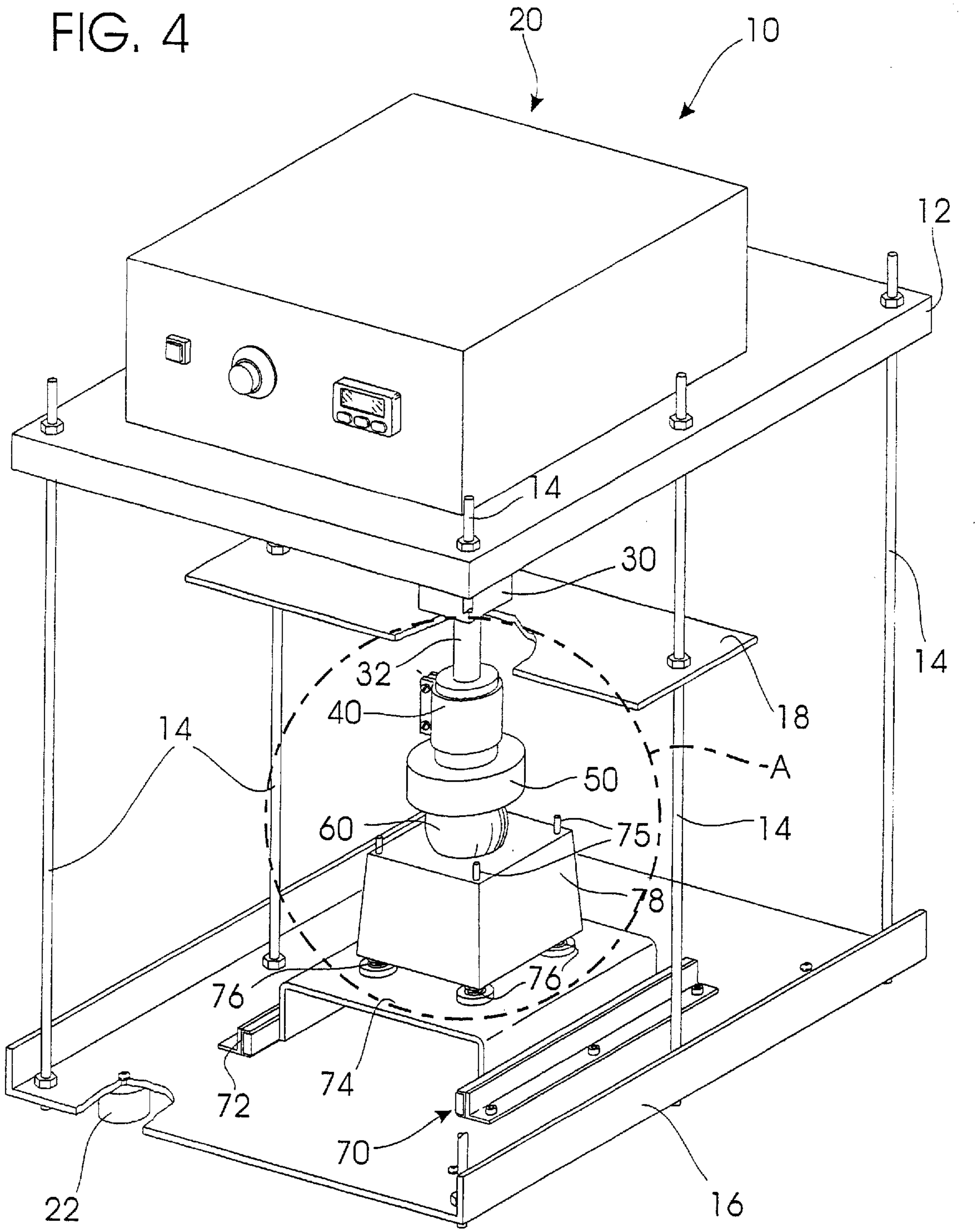
FIG. 4 shows a perspective view of the present invention wherein an object having a spherical surface is having an image applied thereto.

As shown in FIGS. 2 through 4, object 60 which is an object having a spherical surface is placed within depression 82 and holding block 78. Holding block 78 is then received by support posts 75 and rests upon springs 76. Tray 74 is then positioned in a desired location along rails 72. During this action, image 90 is placed in the desired location upon object 60.

Die 50 is then placed in communication with object 60 with image 90 positioned therebetween. Die 50 is placed in position by actuator 30 via extension arm 32.

Figure 5:
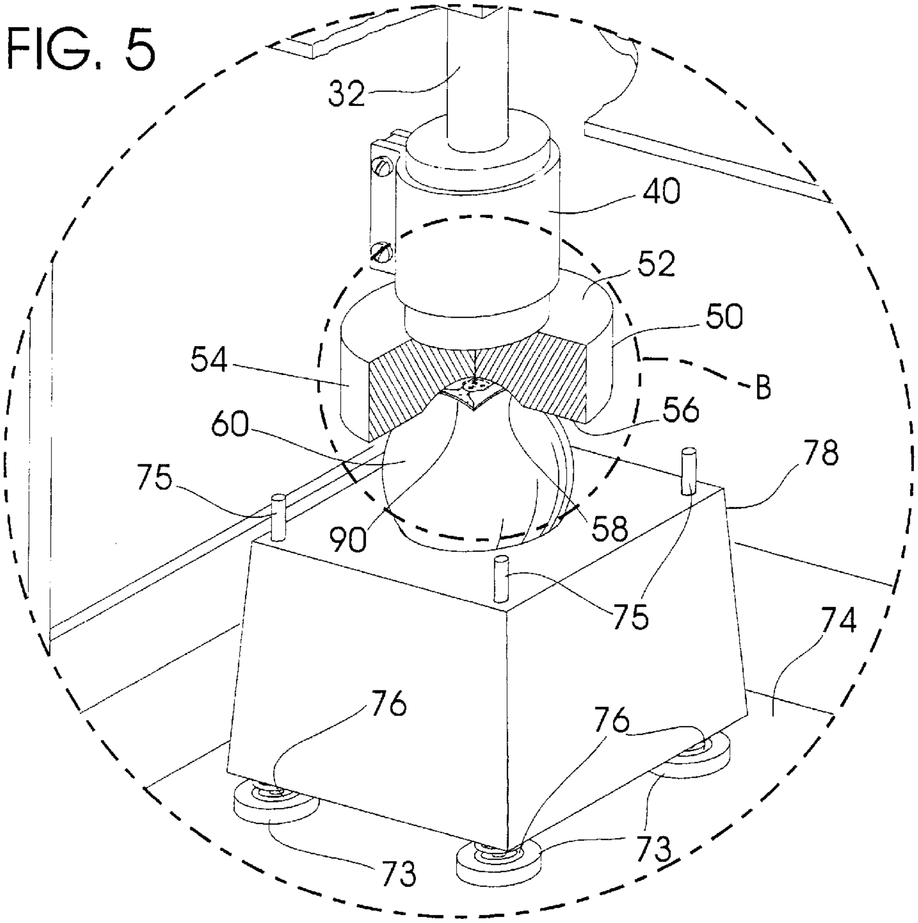
FIG. 5 is a close up view of area "A" of FIG. 4.
Figure 6:
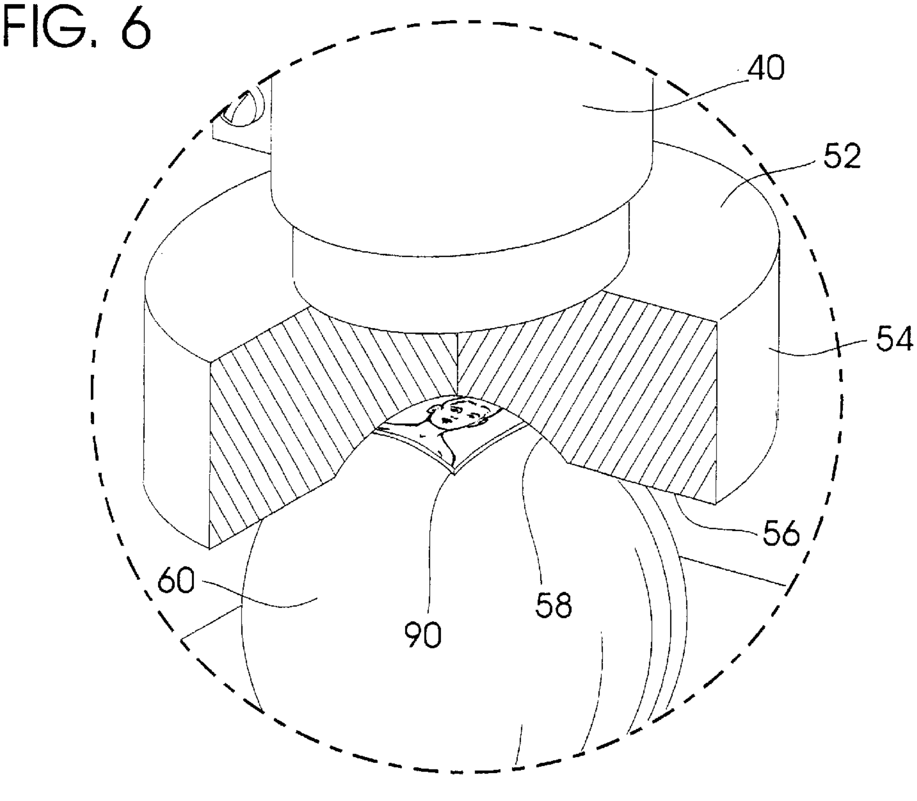
FIG. 6 is a close up view of area "B" of FIG. 5.

Die 50 as shown in FIGS. 5 and 6 has a top 52, a bottom 56 and a side 54 positioned within bottom 56 is a convex surface 58. Convex surface 58 is dimensioned to snugly receive an object having a spherical surface, such as a softball or baseball.

Heat source 40 is able to generate sufficient heat in order to elevate the temperature of die 50.

While heat transfer has been applied to die 50 by heat source 40, image 90 is transferred to the surface of object 60. Once the transfer process has been completed, die 50 and object 60 are then separated with object 60 having image 90 transferred to its surface. Control means 20 monitors the temperature generated by heat source 40 and the alignment of actuator 30.

Figure 9:
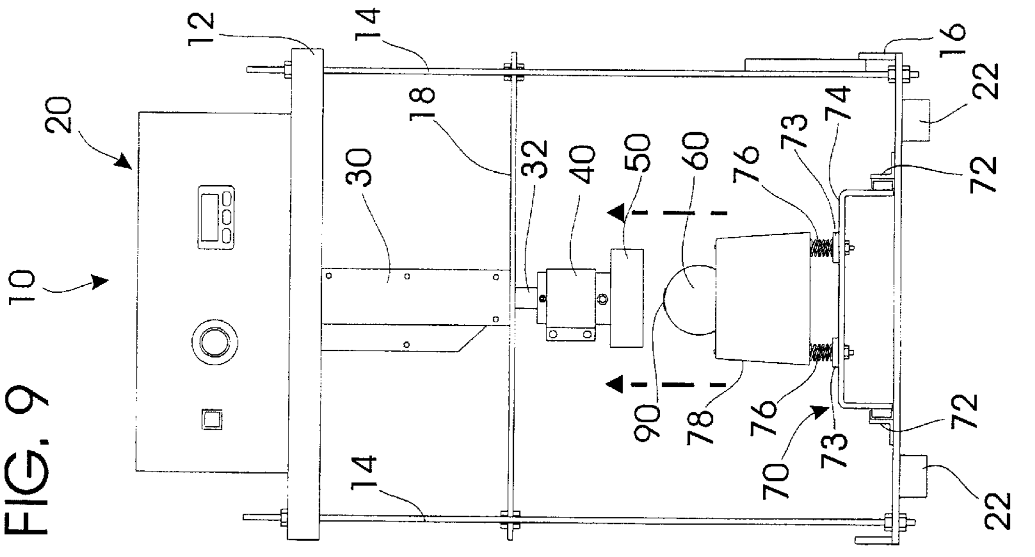
FIGS. 7 through 9 are a series of front view showing the application of an image to a spherical surface pursuant to the present invention.
Figure 8:
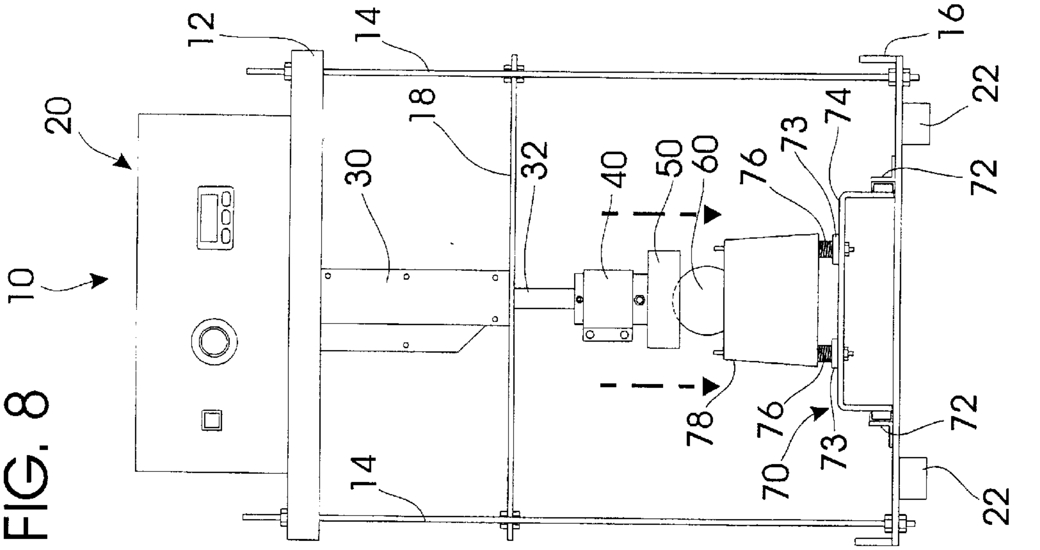
Figure 7:
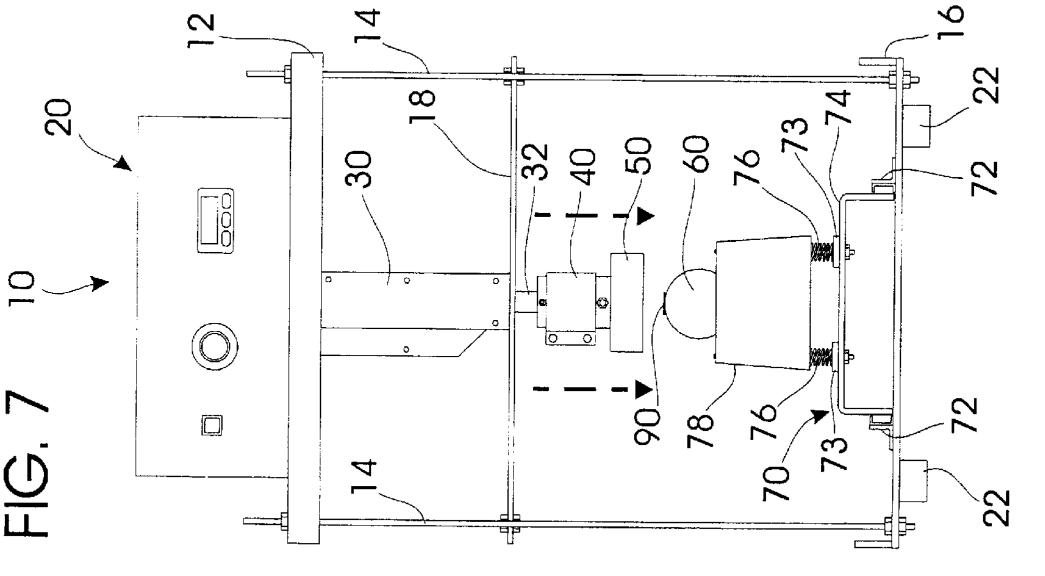

FIGS. 7 through 9 demonstrate a front view of the application of image 90 to object 60 utilizing heat transfer through die 50.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for applying an image having a front side and a back side to an object having a spherical surface comprising:

a support structure having a base and a platform supported above the base by a plurality of support posts;

a heating die having a sherical concave surface, whereby the concave surface is compatable with the spherical surface of the object, said heating die being in communication with a heating means, said heating means providing heat to said heating die;

a first position means to position the heating die in a desired location, said first position means in communication with said platform and said heating means; and a second position means to align the object in the desired location whereby the spherical surface of object is in communication with the concave surface of the heating die, wherein the image is positioned between the concave surface of the heating die and the spherical surface of the object, said second position means being in communication with said base.

2. The apparatus of claim 1 wherein the heating means is a band heater.

3. The apparatus of claim 1 wherein the object is a baseball.

4. The apparatus of claim 1 wherein the second position means is a holding block.

5. The apparatus of claim 4 wherein the holding block is movable along a slidable tray assembly.

6. The apparatus of claim 1 wherein the first position means is a linear actuator.

7. The apparatus of claim 6 wherein the first position means further comprises a drive means connected to said linear actuator.

8. The apparatus of claim 1 wherein the heating die is removable.

9. The apparatus of claim 1 further comprising a control means for monitoring the heat generated from said heating means and the alignment of said first position means and second position means.

10. An apparatus for applying an image to an object having a spherical surface comprising:

a support structure having a base and a platform supported above the base by a plurality of support posts;

a heating means in communication with a linear actuator, said linear actuator in communication with said platform;

a heating die having a spherical concave surface, whereby the concave surface is compatable with the spherical surface of the object, said heating die being in communication with said heating means, said heating means providing heat to said heating die;

a drive means in communication with said linear actuator to position the heating die in a desired location, said drive means in communication with said platform;

a holding block slidably connected to a tray assembly means to align the object in the desired location whereby the spherical surface of object is in communication with the concave surface of the heating die, wherein the image is positioned between the concave surface of the heating die and the spherical surface of the object, said tray assembly is in communication with said base; and a control means for monitoring the heat generated from said heating means and the alignment of said first position means and second position means, said control means is in communication with said platform.

11. The apparatus of claim 10 wherein the heating means is a band heater.

12. The apparatus of claim 10 wherein the object is a baseball.

13. The apparatus of claim 10 wherein the heating die is removable.

14. An apparatus for applying an image to an object having a spherical surface comprising:

a support structure having a base and a platform supported above the base by a plurality of support posts;

a band heater in communication with a linear actuator, said linear actuator in communication with said platform;

a heating die having a spherical concave surface, whereby the concave surface is compatible with the spherical surface of the object, said heating die being in communication with said band heater, said band heater providing heat to said heating die;

a drive means in communication with said linear actuator to position the heating die in a desired location, said drive means in communication with said platform;

a holding block slidably connected to a tray assembly means to align the object in the desired location whereby the spherical surface of object is in communication with the concave surface of the heating die, wherein the image is positioned between the concave surface of the heating die and the spherical surface of the object, said tray assembly is in communication with said base; and a control means for monitoring the heat generated from said band heater and the alignment of said first position means and second position means, said control means is in communication with said platform.

15. The apparatus of claim 14 wherein the object is a baseball.

16. The apparatus of claim 14 wherein the heating die is removable.

* * * * *